(12) United States Patent
Ainsworth

(10) Patent No.: US 10,027,560 B2
(45) Date of Patent: Jul. 17, 2018

(54) LEADER ELECTION IN DISTRIBUTED COMPUTER SYSTEM

(71) Applicant: HULU, LLC, Santa Monica, CA (US)

(72) Inventor: Keith Ainsworth, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 305 days.

(21) Appl. No.: 14/939,859

(22) Filed: Nov. 12, 2015

(65) Prior Publication Data

US 2017/0141971 A1   May 18, 2017

(51) Int. Cl.
*H04L 12/24* (2006.01)
*G06F 11/07* (2006.01)
*H04L 29/08* (2006.01)

(52) U.S. Cl.
CPC ...... *H04L 41/5054* (2013.01); *G06F 11/0709* (2013.01); *G06F 11/0751* (2013.01); *G06F 11/0793* (2013.01); *H04L 67/1095* (2013.01); *H04L 67/1097* (2013.01)

(58) Field of Classification Search
CPC .................. H04L 41/0813; H04L 41/0816
See application file for complete search history.

(56) References Cited

U.S. PATENT DOCUMENTS

| 5,261,085 A | 11/1993 | Lamport |
| 7,287,180 B1 * | 10/2007 | Chen ................... G06F 11/2033 714/11 |
| 8,843,441 B1 | 9/2014 | Rath et al. |
| 9,047,246 B1 * | 6/2015 | Rahut ................. G06F 11/1425 |

* cited by examiner

*Primary Examiner* — Jerry B Dennison
(74) *Attorney, Agent, or Firm* — Fountainhead Law Group P.C.

(57) ABSTRACT

Particular embodiments use a process that can invalidate an elected leader using an invalidated leader value. The availability and use of the invalidated leader value can avoid the requirement of performing a new election round to elect a new leader. When one node of the group detects that there may be a fault with respect to the leader of the system, the node can start the process to establish a new leader autonomously. First, the node can invalidate the leader. Then, the node attempts to propose a new leader. If a quorum is received, then the proposed leader may be elected as the new leader. By invalidating the old leader, the node can ensure that the old leader cannot be elected the new leader once the quorum is received for the new leader.

20 Claims, 11 Drawing Sheets

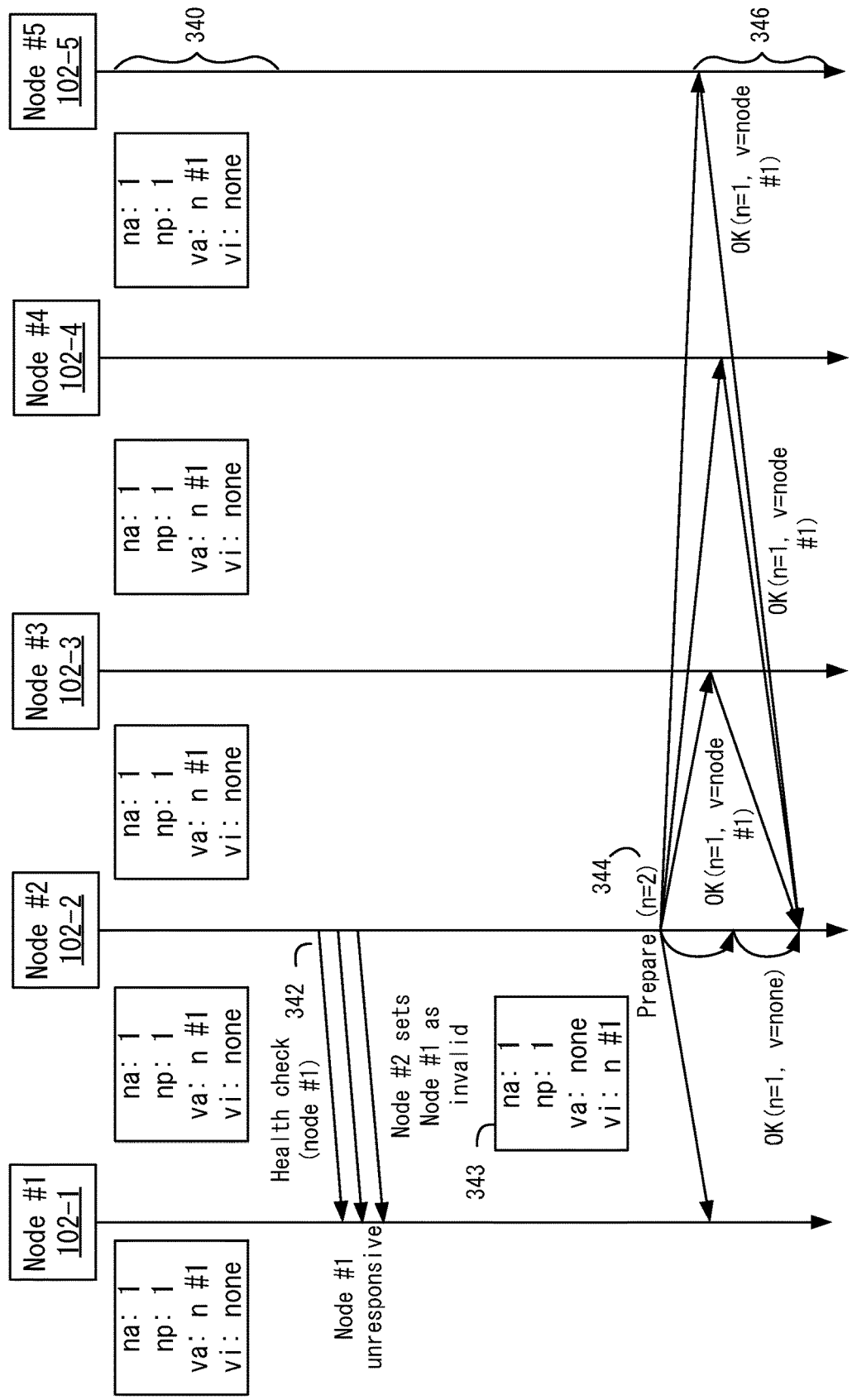

LEADER ELECTION IN DISTRIBUTED COMPUTER SYSTEM

BACKGROUND

Database systems may manage large amounts of data and distribute or replicate the data across multiple nodes. These nodes may also be in different locations and communicate through a network. To reliably store data in the distributed database system, it is essential that the nodes be able to communicate to coordinate the replication of data. One example involves electing a leader of the group of nodes. This leader can then coordinate the storing of data in the distributed database system.

If for any reason the leader has a failure or there is a failure from one of the computing devices being able to reach the leader, a process should be in place to elect a new leader. Often, this involves a new election round to be held among the nodes. This generally required highly specific time synchronization and the need to know the prior state of the election.

SUMMARY

In one embodiment, a method stores, by a first computing node in a group of computing nodes, a first variable for a first proposal number that was accepted, a second variable for a second proposal number of an accepted leader, a third variable for the accepted leader, and a fourth variable for an invalidated computing node. The first computing node performs a first comparison with the first variable and a third proposal number to determine whether to accept or reject a proposal for an election of a leader. Also, the first computing node performs a second comparison with a fourth proposal number and the first variable and the second variable to determine whether to accept or reject a commitment to a proposed leader in the election when it is determined the proposal of the election is accepted. Then, the first computing node performs a third comparison with the fourth variable and the proposed leader to determine whether the proposed leader has been invalidated or has not been invalidated when it is determined the commitment is accepted. When it is determined the proposed leader has not been invalidated, the first computing node commits to the proposed leader for the group of computing nodes as the third variable.

In one embodiment, a method includes: storing, by a first computing node in a group of computing nodes, a first variable for a first proposal number that was accepted, a second variable for a second proposal number of an accepted leader, a third variable for the accepted leader, and a fourth variable for an invalidated computing node; determining, by the first computing node, that a health of a second node that is the accepted leader of the group of computing nodes is invalid; calculating, by the first computing node, a third proposal number for a proposal of an election for a leader based on the first proposal number of the first variable; sending, by the first computing node, a set of first messages with the third proposal number to the group of computing nodes to propose the election for the leader; determining, by the first computing node, if a first quorum for the third variable is reached from a set of first responses including the third variable, the first quorum indicating the election for the leader is accepted; when the quorum is reached, sending, by the first computing node, a set of second messages with a fourth proposal number based on the first proposal number and a proposed leader to the group of computing nodes to propose the proposed leader as the leader of the group of computing nodes, wherein the set of second messages reject the proposed leader when the proposed leader is equal to the fourth variable at the group of computing nodes; and determining, by the first computing node, if a second quorum is reached from a set of second responses including a fourth proposal number for the second variable, the second quorum indicating the proposed leader is accepted.

In one embodiment, a first computing node includes: one or more computer processors; and a non-transitory computer-readable storage medium comprising instructions, that when executed, control the one or more computer processors to be configured for: storing, by a first computing node in a group of computing nodes, a first variable for a first proposal number that was accepted, a second variable for a second proposal number of an accepted leader, a third variable for the accepted leader, and a fourth variable for an invalidated computing node; performing, by the first computing node, a first comparison with the first variable and a third proposal number to determine whether to accept or reject a proposal for an election of a leader; performing, by the first computing node, a second comparison with a fourth proposal number and the first variable and the second variable to determine whether to accept or reject a commitment to a proposed leader in the election when it is determined the proposal of the election is accepted; performing, by the first computing node, a third comparison with the fourth variable and the proposed leader to determine whether the proposed leader has been invalidated or has not been invalidated when it is determined the commitment is accepted; and when it is determined the proposed leader has not been invalidated, committing to the proposed leader for the group of computing nodes as the third variable.

The following detailed description and accompanying drawings provide a better understanding of the nature and advantages of particular embodiments.

BRIEF DESCRIPTION OF THE DRAWINGS

FIG. 3E depicts a first part of the method for invalidating the leader according to one embodiment.

DETAILED DESCRIPTION

Described herein are techniques for a leader election system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a distributed database system that can elect a new leader of the system when a fault is detected. Particular embodiments use a process that can invalidate an elected leader using an invalidated leader value. The availability and use of the invalidated leader value can avoid the requirement of performing a new election round to elect a new leader. When one node of the group detects that there may be a fault with respect to the leader of the system, the node can start the process to establish a new leader autonomously. First, the node can invalidate the leader. Then, the node attempts to propose a new leader. If a quorum is received, then the proposed leader may be elected as the new leader. By invalidating the old leader, the node can ensure that the old leader cannot be elected the new leader once the quorum is received for the new leader. The node can then overwrite the identifier for the old leader with an identifier for the new leader.

System Overview

Figure 1:
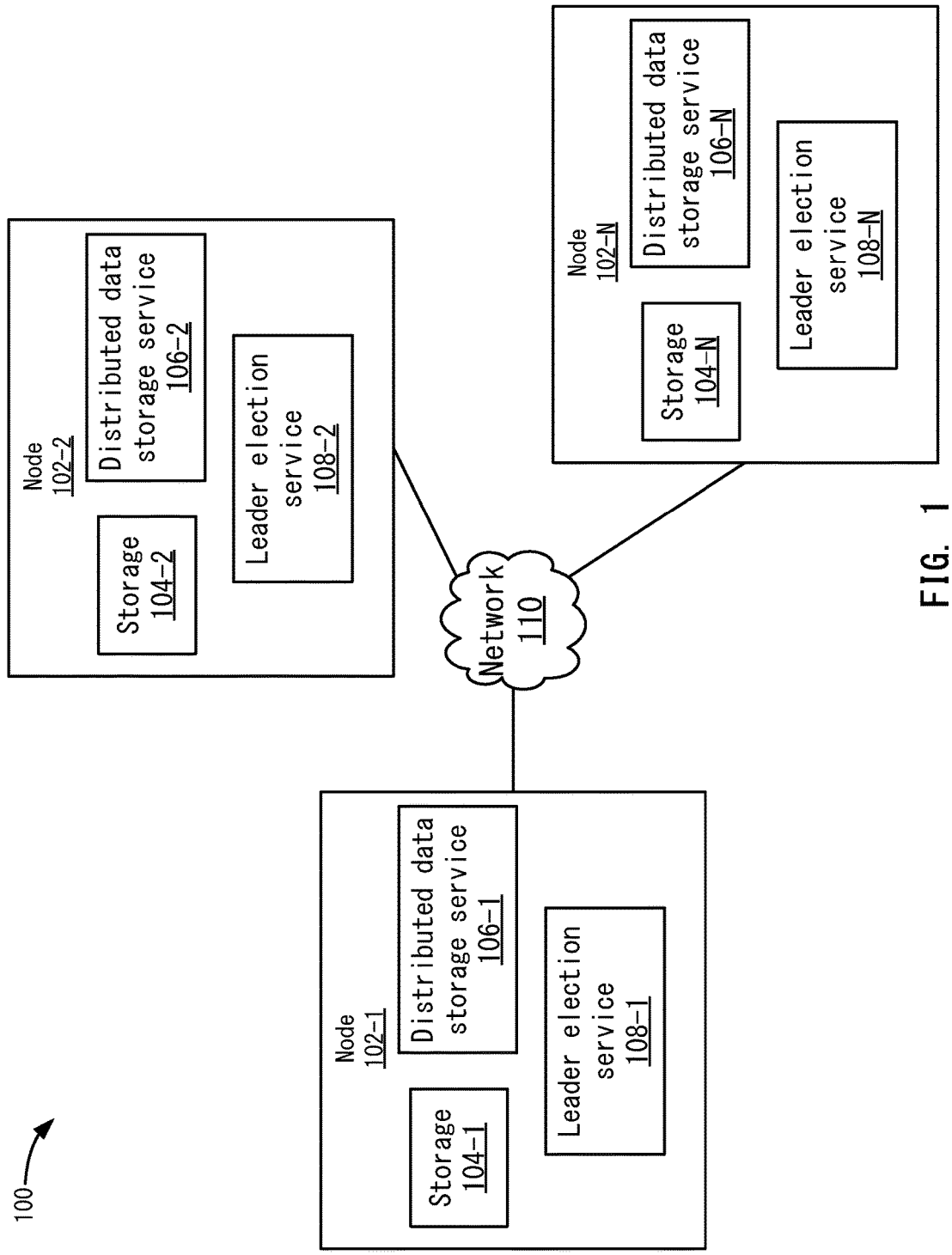
FIG. 1 depicts a simplified system of a method for providing a distributed database storage system with a leader election process according to one embodiment.

FIG. 1 depicts a simplified system 100 of a method for providing a distributed database storage system with a leader election process according to one embodiment. Nodes 102-1, 102-2, -102-N may be computing devices, such as servers or other data storage system elements. Nodes 102-1-N may include storage 104-1-N that may store data for system 100. The data may include data that may be distributed and/or replicated via a network 110 across different nodes 102 in system 100. Nodes 102 may communicate among each other to coordinate the storing of data. In one embodiment, a leader node may coordinate the storing of data in the distributed manner. Thus, it is important to make sure the leader of the nodes has not failed. When a fault occurs with the leader, then a new leader should be established. A fault may be when a leader does not respond to health check requests, which may be due to a failure at the leader or a network failure.

Each node 102 includes a distributed data storage service 106 that can coordinate the storing of data in a distributed fashion. Distributed data storage service 106 may communicate with other distributed data storage services 106 in other nodes 102 to store data in a replicated fashion.

Each node 102-1-102-N also includes a leader election service 108-1-108-N that can perform the election of a leader. In one embodiment, a two-phase election process is used to elect a leader. Once a leader is elected, particular embodiments use an election process that provides for the durability of a leader in the system. When a node 102 detects a failure with the current leader, that node invalidates the current leader. This invalidation may allow the original election of the leader to be overwritten with a new leader. Thus, particular embodiments maintain a single election round for a leader, and not a log of transactions of the elected leaders. Also, a durable mechanism for modifying the elected value is provided. Any new election rounds that happen may override the state of the distributed system as it currently exists. This is different from a transaction log algorithm in which logs to establish the leader are not modifiable. In contrast, particular embodiments use a framework that maintains a log of one transaction that can be changed.

Figure 2:
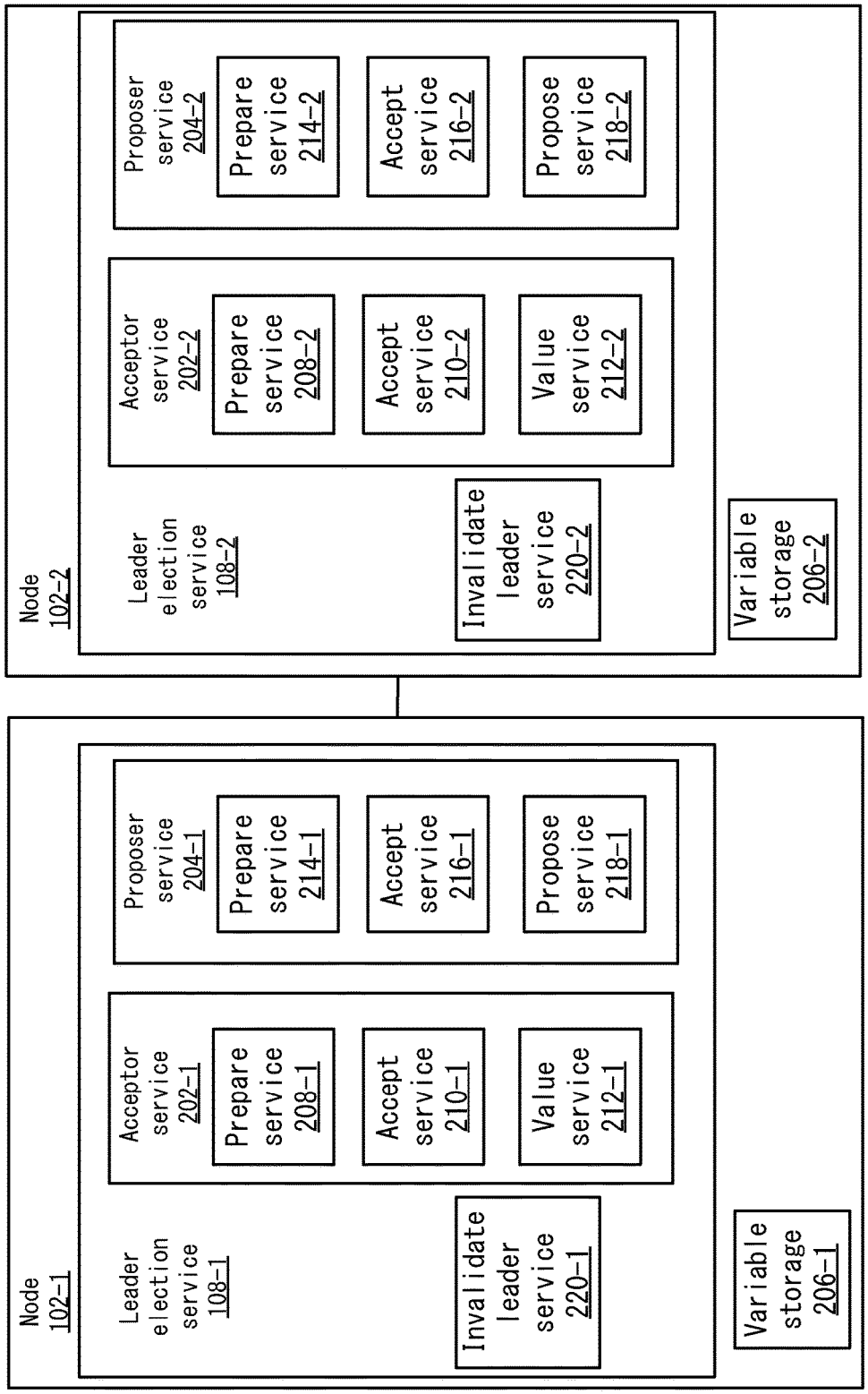
FIG. 2 depicts a more detailed example of leader election services 108 for an acceptor service and a proposer service according to one embodiment.

Each node 102 may operate in multiple modes, such as a first mode as a proposer and a second mode as an acceptor. A proposer service allows a node to propose a new leader election. An acceptor service allows nodes to accept/deny the proposal. If the proposal is accepted, the acceptor service allows the node to propose a value for a new leader and the nodes can accept/deny the new value of the leader. FIG. 2 depicts a more detailed example of leader election services 108 for an acceptor service 202 and a proposer service 204 according to one embodiment. Each node 102 may include the acceptor service and proposer service, and both services may be running at the same time in a single node. In the following description, a first node 102-1 and a second node 102-2 are described, but it will be understood that first node 102-1 may be performing the same process with other nodes 102, and also itself. Further, if second node 102-2 (and any other nodes) also detect a failure of the current leader, then these nodes may also be performing the same process as described with respect to first node 102-1 in parallel. Also, although only two nodes are shown, the processes may be performed with other nodes.

Nodes 102-1 and 102-2 may include acceptor service 202-1 and 202-2, proposer service 204-1 and 204-2, and variable storage 206-1 and 206-2, respectively. Acceptor service 202 may include a prepare service 208, an accept service 210, and a value service 212. Proposer service 204 may include a prepare service 214, an accept service 216, and a propose service 218. Variable storage 206 may include storage for variables that may be set during the process. For example, values for the variables np, na, va, and vi may be stored. The variable np is the highest proposal number that is accepted; the value na is the proposal number of the accepted value; the variable va is the elected value; and the variable vi is an invalidated value, which possibly may be none.

In the process, when a first node 102-1 detects a failure of the current leader, first node 102-1 uses proposer service 204-1 to propose a new leader in a first phase. This phase is used to determine if a new leader value should be proposed for election. If a quorum is not reached, then first node 102-1 does not perform the accept phase. The quorum may not be reached if less than a majority (or a threshold) of other nodes in the group have not detected a failure of the leader. This prevents election of a new leader if only a small number (or just 1 node) has detected a failure of the leader. In some cases, the problem may be a network problem only being experienced by first node 102-1.

If a quorum is reached to elect a new leader, in a second phase, proposer service 204-1 for first node 102-1 uses accept service 216-1 to interact with accept service 210-2 of acceptor service 202-2 of second node 102-2.

The process will be described in more detail. When a failure is detected, proposer service 204-1 of first node 102-1 uses prepare service 214-1 to communicate with prepare service 208-2 in acceptor service 202-2 of second node 102-2. Prepare service 214-1 may be performed in the first stage of the two-phase election process. Prepare service 214-1 queries prepare service 208-2 and passes a variable pmax in the query. The variable pmax may be a highest proposal number suggested by first node 102-1. First node 102-1 generates the proposal number pmax based on an algorithm, such as incrementing a counter, using a hash of a value, etc. When the failure is detected, first node 102-1 may increment the value of the highest proposal number np to generate the value for pmax.

In acceptor service 202-2 of second node 102-2, prepare service 208-2 receives the pmax value, which is referred to as the proposal number of a variable "n". Prepare service 208-2 can compare the proposal number n to the variable np, which is the highest proposal number accepted for second node 102-2. This value may have been stored during the last leader election process. If n>np, then the acceptor service 202 may set the variable np=n. This sets the largest proposal number to be equal to n. Although determining if the value of n is greater than the value of np is discussed, other comparisons may be used, such as determining if the variable n is less than np. After the comparison, prepare service 208-2 returns a message with the value of "True" and the value of variable va, which is the elected value. The elected value may be the value leader election service 108 thinks is the current leader. (this may be redundant) The prepare service 208-2 may return None for va, if that node has no elected leader as va.

If the proposal number n<=np, then prepare service 208-2 returns a message that indicates the value of "False" and the value of np. This indicates that the value of the proposal number n is not greater than the highest proposal number accepted np, which means that this proposal is not valid. Prepare service 208-2 returns the value of the highest proposal value accepted so first node 102-1 can use this value to generate the pmax value in future proposals.

In first node 102-1, prepare service 214-1 receives results from prepare service 208-2 of second node 102-2 (and also other nodes). For example, the result may be a True message with the value of va, which is the elected value, or a False message with the value of np, which is the highest proposal number accepted. If the result is False, then prepare service 214-1 notes the values of (False, np) and stores the value of np as the highest proposal number from the rejection. First node 102-1 can increment this highest proposal number in a next round of the leader election process. If the message returned is True, then prepare service 214-1 may store the value for the variable va, which is the elected value.

The above process may be performed for responses from all prepare services 208 of other nodes 102. If a quorum of nodes 102 responded True (e.g., more than half responded True and in some cases none responded False), and there is a quorum agreeing on the same value for the variable va, then this value va is the elected value. This may halt the election of a new leader. The proposer service may continue the 2$^{nd}$ phase, using only the quorum-confirmed va as opposed to the v it may have initiated the service with. (node 1 starts to elect itself, prepare phase returns a quorum with va=node2, node 1 MAY continue to accept, providing it uses node2). This is important for informing out-of-state nodes (or nodes returning from network outage) of an existing elected value. For example, a quorum of nodes 102 may state that node #1 is the leader. If a quorum of acceptors responded True, and there was a quorum indicating the value for the variable va is "none", which indicates there is no leader, then the second phase to accept a new leader may be performed.

When a quorum is reached in the first phase for both the True responses and the value for the variable va being none, proposer service 204 moves to the second phase of the election process. Proposer service 204-1 in first node 102-1 may perform the following services in proposing a new leader. Propose service 218-1 attempts to run accept service 216-1 with the value v (which could have been amended in the previous step).

Accept service 216-1 may use the variable v, which is the value of the proposed new leader. Accept service 216-1 queries each acceptor's accept service 210-2 in other nodes 102 by passing the value of (pmax, v), which includes the highest proposal number suggested by this proposer affirmed via phase 1 (prepare service), and the value v of the proposed leader. The value v of the proposed leader may identify the proposed leader, which may be first node 102-1.

In second node 102-2, accept service 210-2 may use the values of the proposal number n and the variable v that are received from accept service 216-1. Accept service 210-2 commits to an elected value using the proposal number if certain conditions are met. For example, if the proposal number n is greater than or equal the variable np (n>=np) and the proposal number n is greater than the accepted value na (n>na), which means that the proposal number n is greater than or equal to the highest proposal number accepted and the proposal number of the accepted value, then the following may be performed. First, if the value of the variable v equals the invalidated value (v==vi), then the request is rejected. This means that the variable v is the same as an invalidated value, which means that the leader has been invalidated because of a failure. In this case, this value v is proposing a leader that second node 102-1 has determined to have had a failure and should not be accepted as a leader. If the value of v does not equal the value of vi, then accept service 210-2 sets the variable na=n, which sets the highest proposal number of the accepted value to the proposal number. Further, accept service 210-2 sets the variable va=v, which sets the elected value to the value v. Then, accept service 210 returns a message with the values of (True, na), which indicates the proposal number n has been accepted and set to the value of the variable na.

In first node 102-1, if the value returned from other nodes is (True, va) which means that the value of pmax was greater than the value of np and na, and where the value of va does not equal none (va!=none), the value v being proposed shall be amended such that v=va. In this case, prepare service 208-1 stores the value v for the variable va in variable storage 206 to indicate the new elected value. This value must be accepted by other nodes thereafter.

If the value of n is not greater than the value np and the value of n is not greater than the value of na, then accept service 210 returns a message that indicates this condition was not met in a message with the values of (False, np). Np is the highest number accepted, which may be higher than the proposal number n. If the result returned is (False, np) from other nodes, which means that the value of v was not greater than na or np, then prepare service 218 increases the variable pmax to be equal to np+increment. The decongest service is also performed. The decongest service may cause the proposer to wait an amount of time proportional to the difference between the attempted proposal number and the highest proposal number accepted. This may allow for the proposer process to continue with other nodes.

For each result received from other nodes 102, if the result is (False, np), which indicates that the value pmax was not greater the highest proposal number accepted and not greater than the proposal number of the accepted value (e.g., where np>pmax), then accept service 216-1 returns the value of (False, np). This indicates that the value of pmax was not greater than the value of np. If the result received from other nodes 102 is (True, na), which indicates that the value of pmax was greater than the values of na and np, then accept service 216-1 verifies that na=pmax, which means that the proposal number of the accepted value is equal to the highest proposal number selected by this proposer.

If a quorum returns values (True, na), where na=pmax, then accept service 216-1 returns True. Or else, accept service 216-1 returns False. In the above case, if the proposal number of the accepted value equals the value of pmax, then that value is used and means the value of v is the new leader.

To elect the new leader, accept service 210-1 overwrites the values for na, the proposal number of the accepted value, and va, which is the elected value in variable storage 206. This elects the new leader for the proposal number of the value of v. Accept service 210-1 does not keep a record of the previous leaders due to the overwriting of the values for va and na. This is different from a log that cannot be changed with all of the previous elected leaders. The use of the invalidated value allows the use of a single transaction to keep track of the leader. This is because a node that has been invalidated cannot be elected as the leader when the node is listed as the invalidated value.

At all times, while running the acceptor service 202, a node 102 is responsible for maintaining the validity of its elected value va. At all times when va does not equal none (va!=none), the acceptor service routinely checks the health of the elected leader ensuring that it is in the elected state and accessible. This guarantees that the leader shall know of its election, but also allows a nullification of an invalid leader value. Rather than opening a new election because a node suspects a leader is dead, particular embodiments invalidate the node and then can agree on another leader. The election process overrides the value of the leader when a quorum is reached.

If acceptor service 202-1 receives inconsistent information from an elected leader or no response is received from a routine health check, the following may be performed to possibly elect a new leader. For example, a node 102 wishing to learn a consensus value may query a quorum of the acceptors for a value. For example, value service 212 may be used by learners to establish the elected value. This may be used to determine who has been elected as the leader. Value service 212 may return the value va, which is the elected value. If the quorum is in consensus, then this node 102 accepts their selection as the leader. Or else, no leader information is known. When there is no leader consensus, propose service 218-1 first attempts to use prepare service 214-1 to propose a new leader. This process is the same as described above. If the result received is (False, np), which indicates that pmax is not greater than the highest proposal number accepted, then propose service 218-1 increases the variable pmax to be equal to np+an increment. This increments the value to something greater than the variable np.

When no leader is known or no response is received, an invalid leader process 220 may set the variable vi to be equal to the value of va (vi=va) and the variable va equal to "none" (va=none). This sets the invalidated value to the current leader (e.g., the elected value) and the elected value to none. This overwrites the elected value in variable storage 206. Invalidate leader process 220 can then routinely query the value of vi to ensure it is still invalid. This allows first node 102-1 to recover from determining a current leader is invalid when in reality the current leader is still valid. For example, first node 102-1 may have experienced a network outage that prevented it from reaching the current leader (but other nodes are still able to reach the current leader), but the outage may be fixed and then first node 102-2 is able to reach the current leader. If acceptor service 202 queries vi and it turns out to be valid, then invalidate leader process 220 sets the value of vi=none. In this case, if the current leader recovers from a failure such that the current leader is reachable again, then first node 102-1 can recognize that it is the leader again.

From the above process, the current leader being marked as the value for vi prevents the acceptor service 202-1 from ever accepting this value as the leader. This also causes acceptor service 202-1 to set the value va equal to none as long as the value for vi is the current leader. Further, this causes proposer service 204-1 to propose itself because the value of va is equal to none, and first node 102-1 wants to propose a new leader when the value of va is equal to none.

Setting the value of vi to be va, which sets an invalid leader value to the elected value, the validity of the elected leader may be kept in partial network faults (e.g., not all nodes are affected by a network fault). If a non-majority of acceptors have invalidated the leader, then there still could be a consensus of the current leader. Only if a quorum has reached on the invalidation will ensuing proposals yield a leader election change.

Additionally, if a fault is restored, since invalidating nodes have the value of va equal to none (va=none) and then the value of vi is none (vi=none) after the routine check on invalidity clears, then the prepare service should return a quorum election being the original elected value of va, which can now be accepted. Accordingly, particular embodiments provide a process for electing a new leader when a fault occurs using an invalidated value. This allows multiple nodes 102 to elect a new leader independently.

Method Flows

FIGS. 3A-3D show general processes with three nodes. Then, FIGS. 3E-3G show a more detailed process with five nodes. Other processes may be appreciated different numbers of nodes.

Figure 3A:
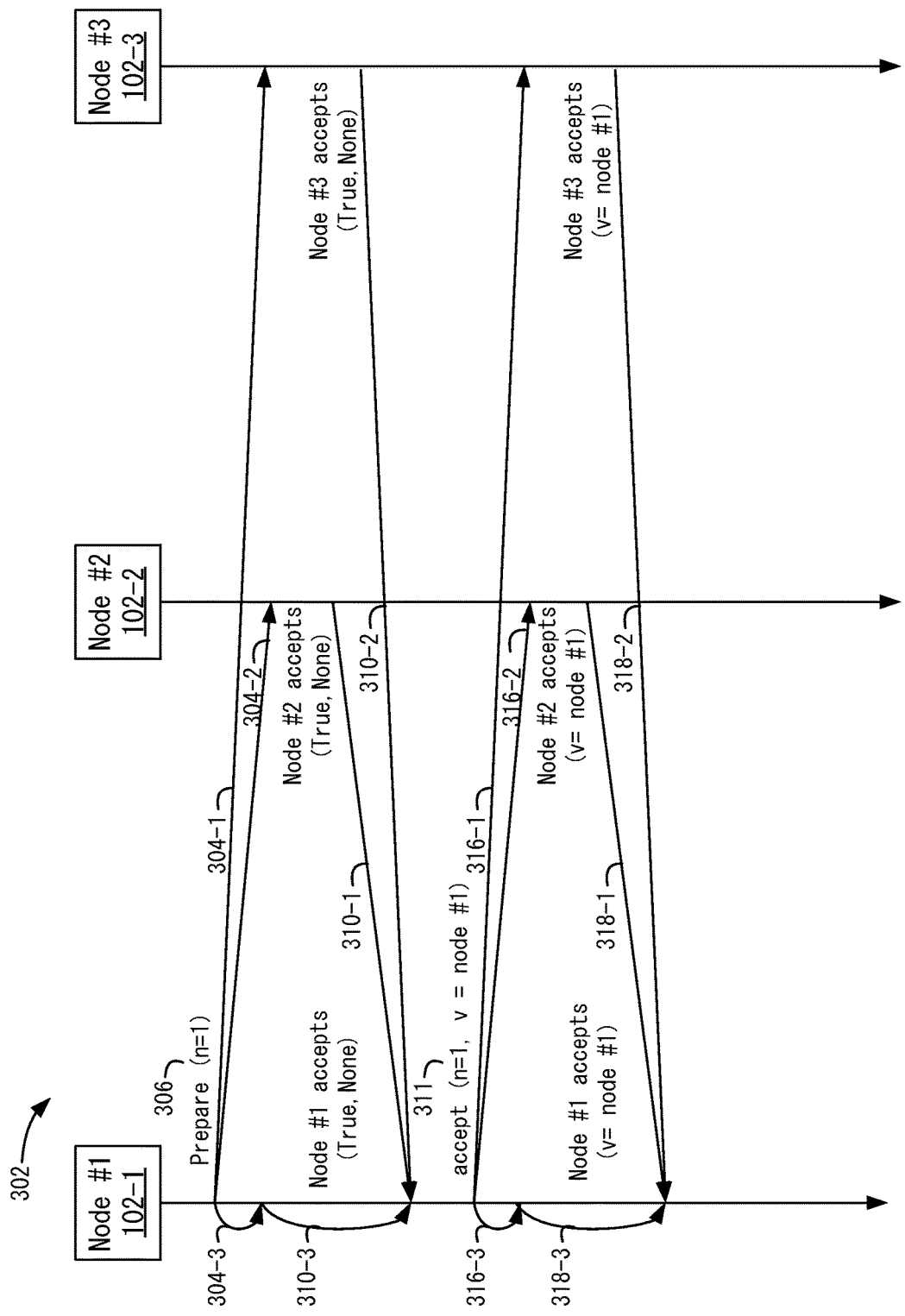
FIG. 3A shows a simplified flowchart for performing acceptor service 202 and proposer service 204 according to one embodiment.

FIG. 3A shows a simplified flowchart 300 for performing acceptor service 202 and proposer service 204 according to one embodiment. Three nodes 102-1, 102-2, and 102-3, referred to as node #1, node #2, and node #3, communicate to elect the leader. It will be understood that other numbers of nodes may also be involved in this process. In a first stage, at 302, a node #1 is a proposer and nodes #1, #2, and #3 are acceptors. That is, node #1 runs proposer service 204 and nodes #2 and #3 run acceptor service 202. Also, node #1 may also be an acceptor at the same time and run acceptor service 202. At this time, there may or may not be a leader at the time. However, node #1 would like to propose a leader and thus uses proposer service 204. To propose a leader, node #1 uses prepare service 214-1 to send a query to each acceptor's prepare service 208-1, 208-2 and 208-3 with the pmax variable value at 304-3, 304-1, and 304-2, respectively. At 306, the query is sent as "prepare (n=1)", where n is the highest proposal number accepted. In this case, the prepare service select n to be pmax.

Node #2 runs prepare service 208-2 to determine if the proposal number is greater than the value of n or less than the value of np that is stored in variable storage 206. In this case, node #2 accepts n=1. Also, node #3 and node #1 also perform the same prepare service methods to accept n=1. In this case, at 310-1, 310-2, and 310-3, nodes #1, #2, and #3 return a message with the values of (True, None), where the value of None is va when there is a not a current elected value. In other cases, where the proposal number is n>np, the node returns (True, va), and in the case where the proposal number is n<np, the node returns (False, np).

Node #1 then runs accept service 216-1. For example, after a quorum of messages that indicate True, accept service 216 queries each acceptor's accept service 210 and passes the values of (pmax, v) where pmax is the highest proposal number suggested by this proposer and v is the identifier for node #1. At 316-1, 316-2, and 316-3, accept service 216-1 sends these queries to node #1, node #2, and node #3, respectively.

Nodes #1, #2, and #3 then use their respective accept services 216 to determine if the proposal number is greater than or equal to the highest proposal number accepted and also greater than the proposal number of the accepted value. Also, if the identifier of the proposed new leader is not equal to an invalidated leader, then, nodes #1, #2, and #3 accept node #1 as their elected leader and return messages at 318-1, 318-2, and 318-3, respectively. At this point, node #1 is the elected leader of the system. As discussed above, each acceptor sets the values of na=n and va=v. This sets the proposal number of the elected value to n and also the elected value to v.

Figure 3B:
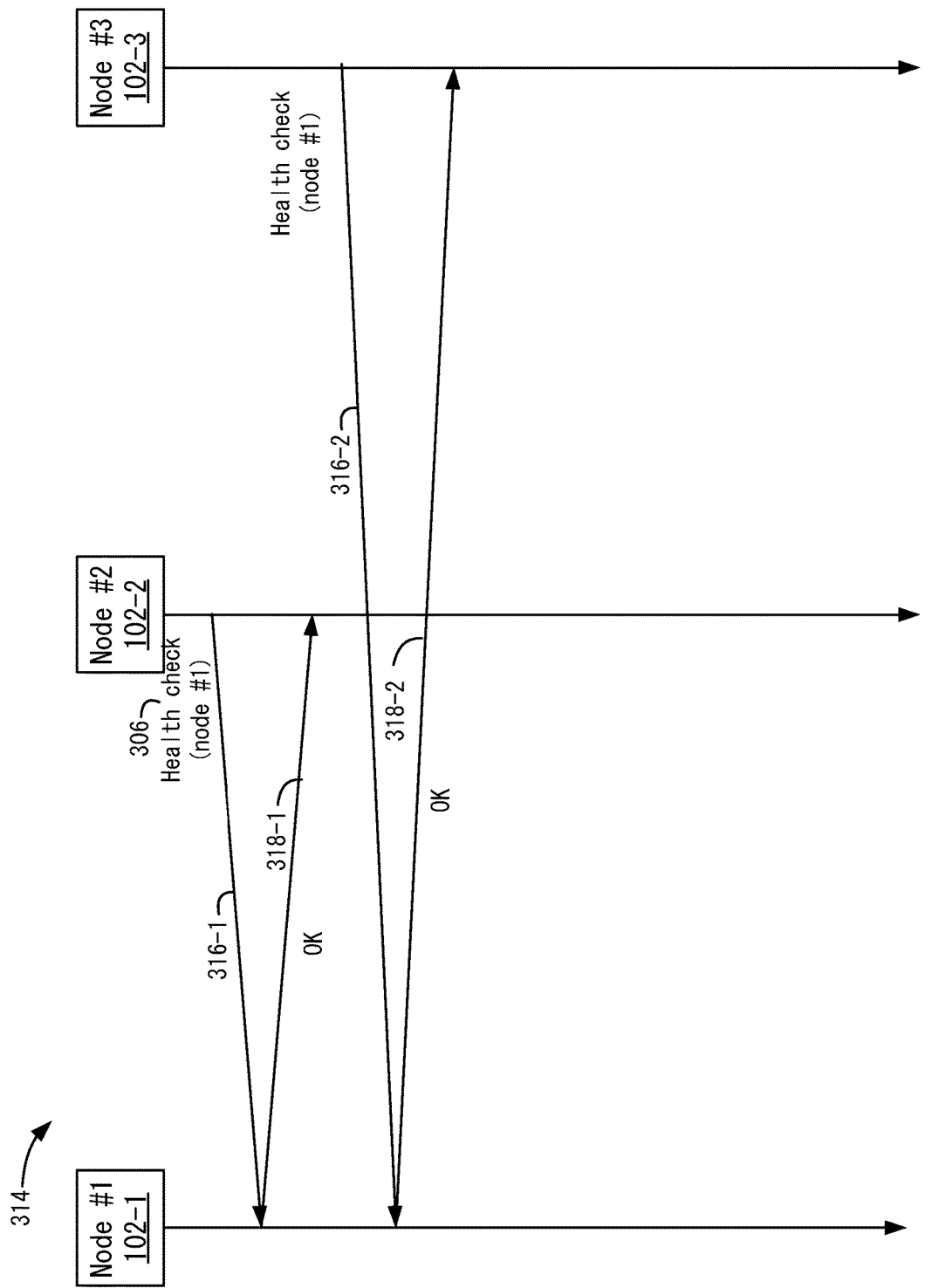
FIG. 3B shows the health check process according to one embodiment.

Once the leader is selected, health checks may be performed. FIG. 3B shows the health check process at 314 according to one embodiment. In this case, node #2 and node #3 may send health checks to node #1. For example, at 316-1 and 316-2, node #2 and node #3 have sent health checks to node #1. At 318-1 and 318-2, node #1 sends responses to node #2 and node #3, respectively, indicating the health of node #1 passes.

Figure 3C:
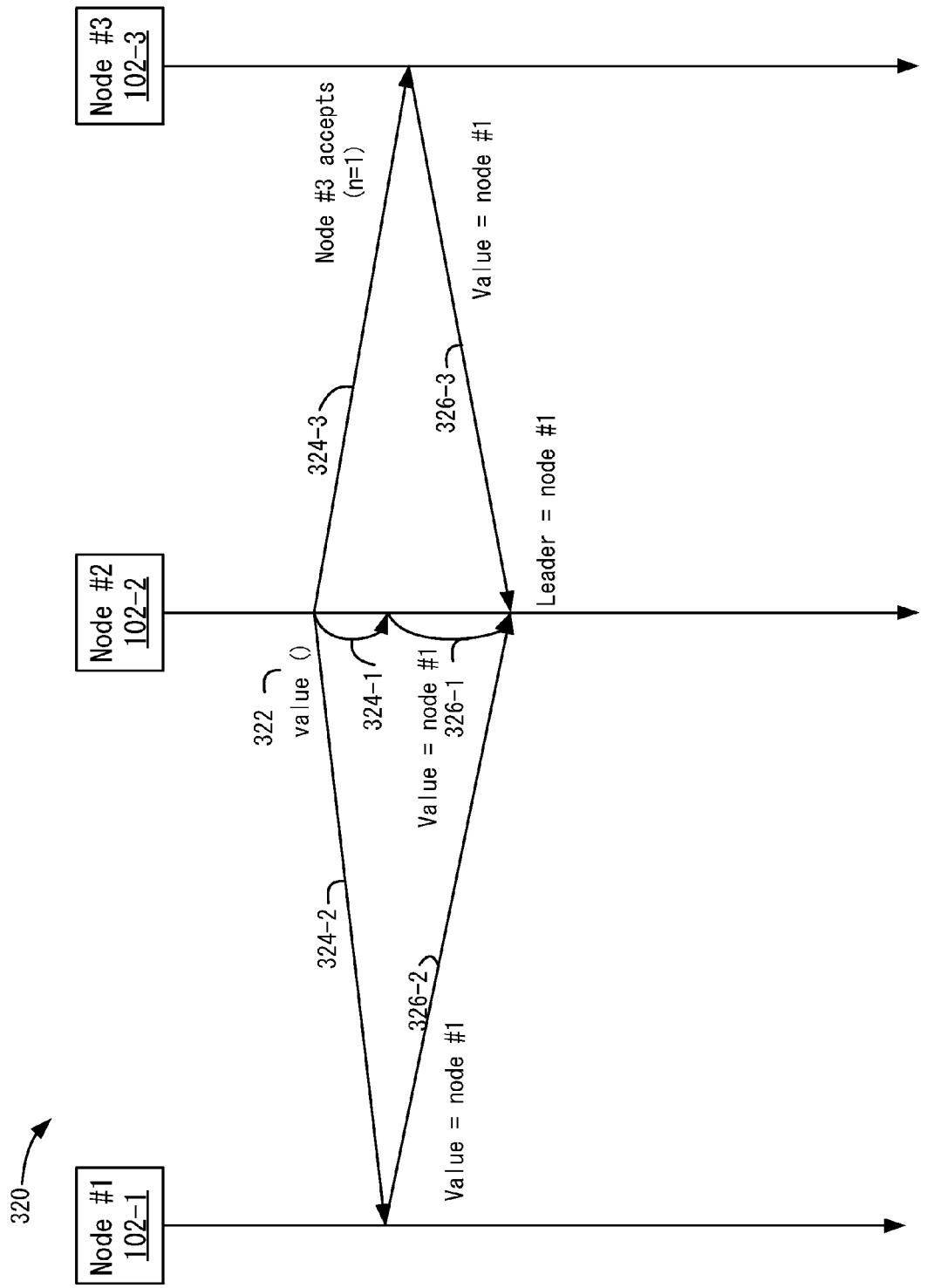
FIG. 3C shows the use of the value service according to one embodiment.

In another example, a node may want to learn the elected value using value service 212. FIG. 3C shows the use of the value service at 320 according to one embodiment. At 322, node #2 may use value service 212 to learn the elected value. For example, at 324-1, 324-2, and 324-3, node #2 sends a value message—value ( )—to node #2, node #1, and node #3, respectively. Each node then responds with the value of the leader. That is, acceptor service 210 may return the value of the elected leader using the variable va. At 326-1, 326-2, and 326-3, nodes #2, #1, and #3 return the value of leader as node #1. In this case, all nodes respond and the quorum is affirmed that the leader is node #1. This means that all nodes #1-#3 think the leader is node #1.

Figure 3D:
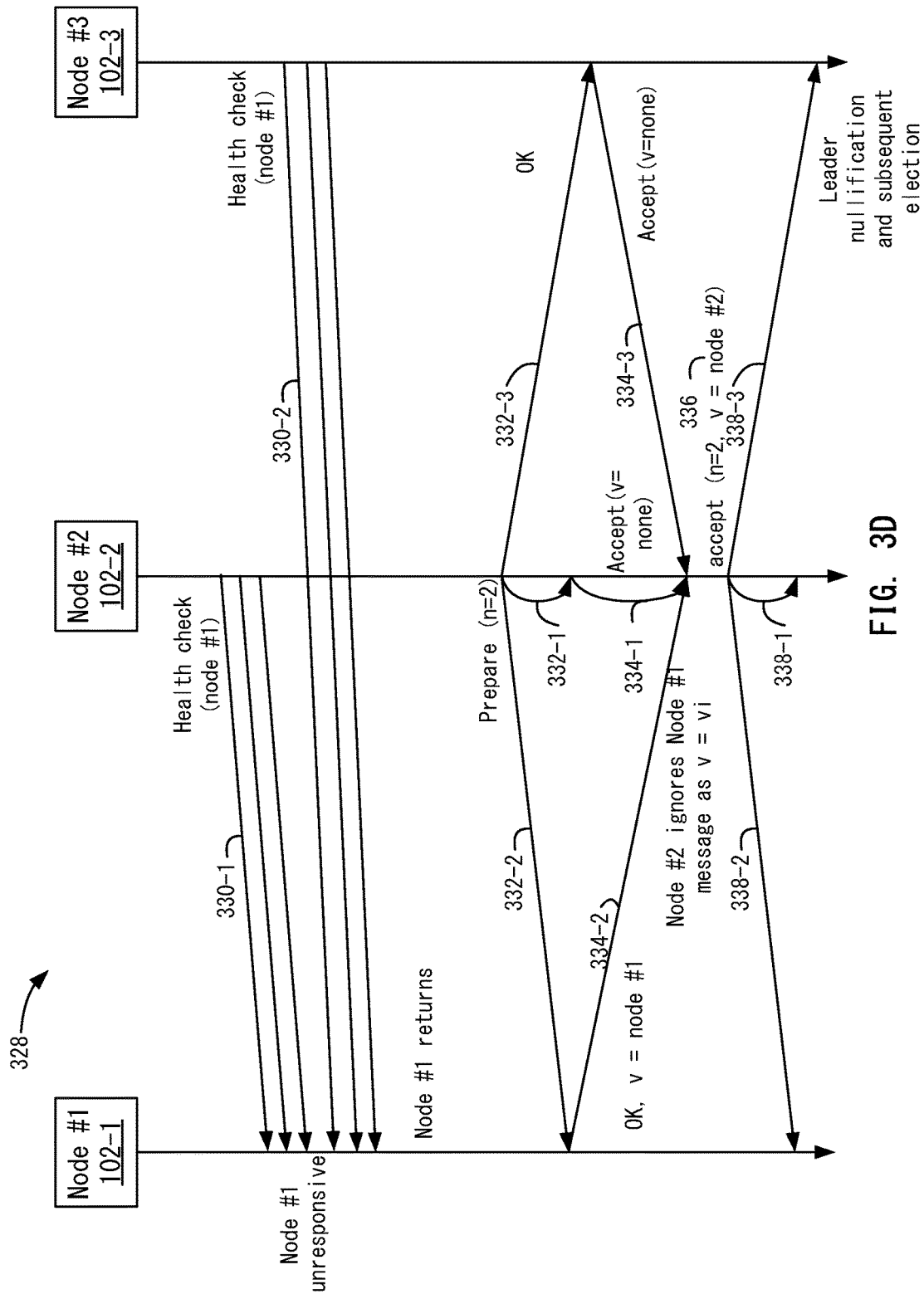
FIG. 3D shows the process of invalidating a leader according to one embodiment.
Figure 3F:
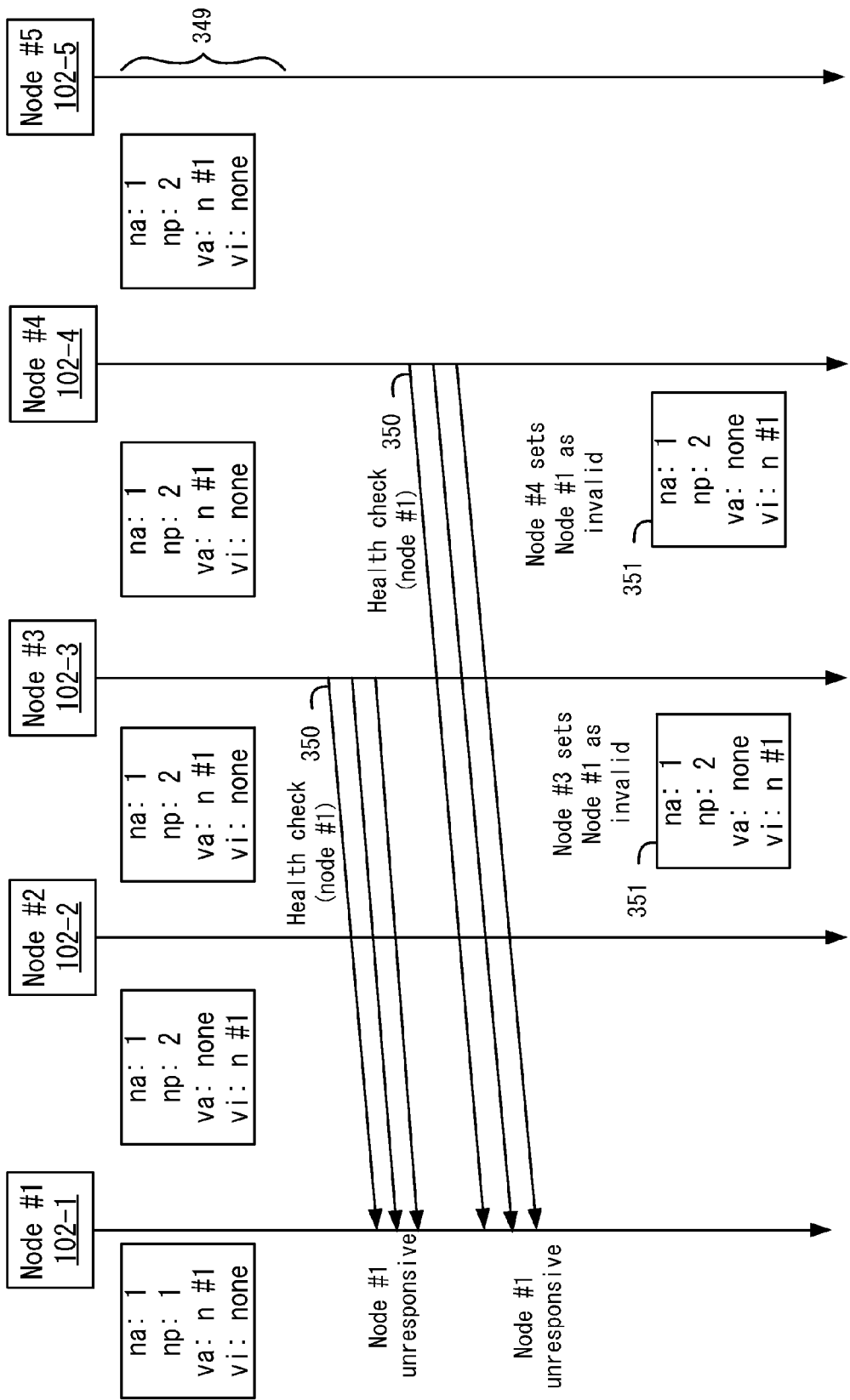
FIG. 3F depicts a second part of the method for invalidating the leader at nodes #3 and #4 according to one embodiment.
Figure 3G:
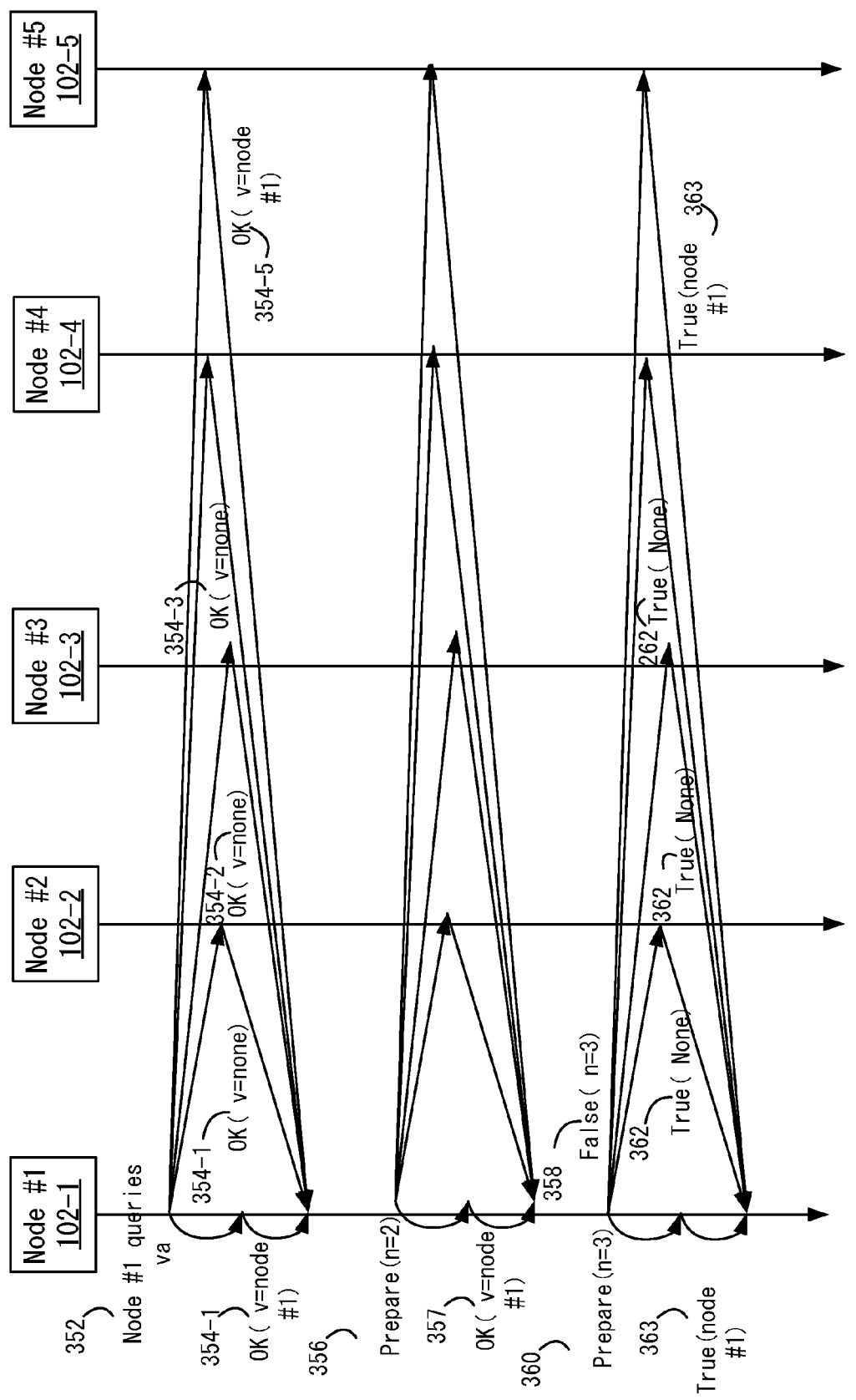
FIG. 3G depicts a third part of the method for node #1 attempting to become the leader according to one embodiment.

In another example, a node may need to invalidate a leader when a failure is detected. FIG. 3D shows the process of invalidating a leader at 328 according to one embodiment. A process for invalidating the current leader node #1 and electing a new leader is shown. At 330-1, node #2 sends multiple health check messages to node #1 to which node #1 is unresponsive. At 330-2, node #3 also sends health check messages to which node #1 is unresponsive.

In view of the above, node #2 believes that a failure has occurred and a new leader should be elected. Node #2 then uses prepare service 214 to query each acceptor's prepare method to prepare for electing a new leader. In this case, node #2 uses the proposal number n=2. At 332-1, 332-2, and 332-3, node #2 sends the prepare message to nodes #2, #1, and #3. Nodes #1, #2, and #3 then use prepare service 208 to determine if this proposal number should be accepted.

If so, at 334-1, 334-2, and 334-3, nodes #2, #1, and #3 respond. Nodes #2 and #3 respond accepting the proposal number. Node #3 has invalidated node #1 and accepts the proposal without providing any indication of who the leader is. However, node #1 responds with the value of v=node #1. In this case, node #1 has returned from the failure and indicates that node #1 is the leader by returning the variable va being the elected value as node #1. Node #2 and node #3 do not have values for va because va has been set to none and vi has been set to node #1. Nodes #2 and #3 ignore this message from node #1 because of the invalidated value being equal to node #1.

A quorum has thus been reached because node #2 and node #3 have indicated that the proposal number of 2 is okay. At 336, node #2 then uses accept service 216 to propose the new leader with the message accept (n=2, v=node#2). This indicates that the proposal number is 2 and the proposed new leader is node #2. At 338-1, 338-2, and 338-3, node #2 sends the accept messages. Nodes #1, #2, and #3 then use accept service 210 to determine if this value should be accepted. In one example, node #1 may be in a failure state and cannot elect the new leader. Node #1 may query for the new leader when it is restarted at a later time. If node #1 is back online, it will be impossible for node #1 to have a higher np,na (since they monotonically increase), so node #1 will honor the accept request and set na=2, np=2, va=node #2. Node #2 and node #3 compare the proposed value n to the variable np and na. In this case, the value of 2 is greater than the value of np and na. Further, node #2 is not listed in as the value for vi. Accordingly, at 340-1 and 340-2, node #2 and node #3 accept this value and node #2 is elected as the new leader based on a quorum. Node #1 will have to accept the new leader at this time due to the quorum being reached.

FIGS. 3E-3I depict another example of a method for invalidating and electing a new leader according to one embodiment. This method includes five nodes, 102-1-102-5, and referred to as nodes #1-#5. FIG. 3E depicts a first part of the method for invalidating the leader according to one embodiment. In this case, as shown at 340, the values for variables na, np, va, and vi are 1, 1, node #1, and none. This means that the highest proposal number accepted np is 1, the proposal number of the accepted value na is 1, the elected value va is node #1, and the invalidated value vi is none. That is, node #1 is the leader and there are no invalidated nodes.

At 342, node #2 sends health check messages to node #1 and does not receive a response. Accordingly, node #2 sets node #1 as invalid. This sets the invalidated value vi to node #1 and also the elected value va is now empty (e.g., none) as shown at 343.

Node #2 has no value for the elected value va and thus proposes itself as the new leader. The prepare service needs to be run first before proposing itself. At 344, node #2 uses prepare service 214 to send messages to all nodes with the value of n=2 (prepare (n=2)). The value of n is the proposal number that can be compared to the highest proposal number accepted np.

At 346, node #3, node #4, and node #5 send messages that accept the proposal number as being higher than the highest proposal number accepted. However, node #3, node #4, and node #5 indicate that the elected value is node #1. That is, at this time, they have not detected a failure at node #1 and have not invalidated node #1 as the leader. Also, node #2 indicates the value of the leader is none. Because node #2 has set the invalidated value vi to node #1, node #2 halts this election. This is because a quorum has not been reached to continue with the accept process. One reason node #2 halts the election process is that node #2 should not be allowed to elect a new leader. That is, node #2 should not be allowed to continue a proposal with value v, where v!=the quorum accepted value or where v=vi. In this case, a quorum of other nodes still has node #1 has the valid leader.

FIG. 3F depicts a second part of the method for invalidating the leader at nodes #3 and #4 according to one embodiment. At 349, the value of np has been incremented to "2" at nodes #2, #3, #4, and #5 due to receiving the prepare message previously. At 350, nodes #3 and #4 send health checks to node #1 and do not receive responses. This causes node #3 and node #4 to set node #1 as the invalidated value vi and set va to none as shown at 351.

FIG. 3G depicts a third part of the method for node #1 attempting to become the leader according to one embodiment. At 352, node #1 may come back online and can use value service 212 to query the elected value va. In this case, nodes #2, #3, and #4 at 354-1, 354-2, and 354-3, respectively, respond with the value of none and at 354-4 and 354-5, node #1 and node #5 respond with node #1. There is no consensus on the leader in this case because the value of none is in the majority of responses. Node #1 then tries to re-establish being leader at 356. For example, node #1 uses prepare service 214 to send a prepare message all nodes. However, the value of the highest proposal number is equal to 2 and prepare (n=2) to at 358, nodes #2, #3, #4, and #5 reject this prepare request and indicate np=2. At 360, node #1 then sends another prepare message with a higher proposal number as prepare (n=3). This is true, and at 362, this prepare message is accepted by all nodes. In this case, the highest proposal number accepted np is now 3 at all nodes. Also, at 363, the elected value va is "node #1" at nodes #1 and #5, and at 364, the elected value is "none" at nodes #2, #3, and #4.

Figure 3H:
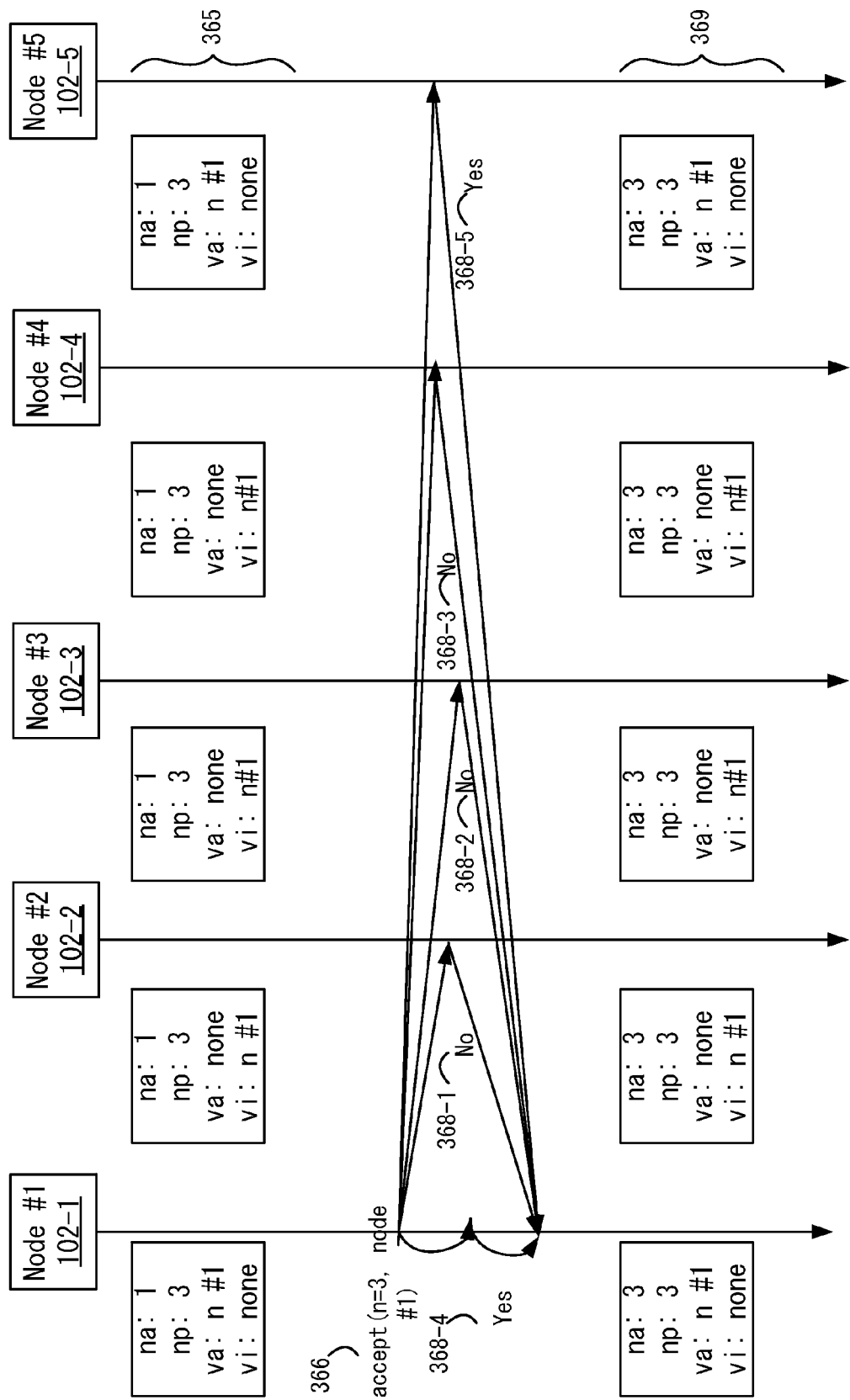
FIG. 3H depicts a fourth part of the method for node #1 attempting to become the leader according to one embodiment.

FIG. 3H depicts a fourth part of the method for node #1 attempting to become the leader according to one embodiment. At 365, the current values of the variables are shown. The value for np is now "3" with nodes #2, #3, and #4 having node #1 as the invalidated node for the value of vi. At 366, node #1 uses accept service 216 to propose itself in a message accept (n=3, v=node #1). In this case, at 368-1, -2, and -3, nodes #2, #3, and #4 determine that node #1 is equal to the invalidated value vi and sends a message not accepting node #1 as the leader. At 368-4 and 368-5, node #5 and node #1, respectively, respond accepting the node #1 as the leader because the invalidated value for these nodes is none. Because nodes #2, #3, and #4 reject the accept message, the re-electing of node #1 is prevented at nodes #1, #2, and #3. The use of the invalidated value allows the proposal of node #1 as the leader to be rejected when node #1 is listed as the invalidated value. However, if node #1 has come back online and is healthy, node #1 can be elected leader when the vi value is cleared by the other nodes. At 369, the value of na has been incremented to "3" as the highest proposal number accepted.

Figure 3I:
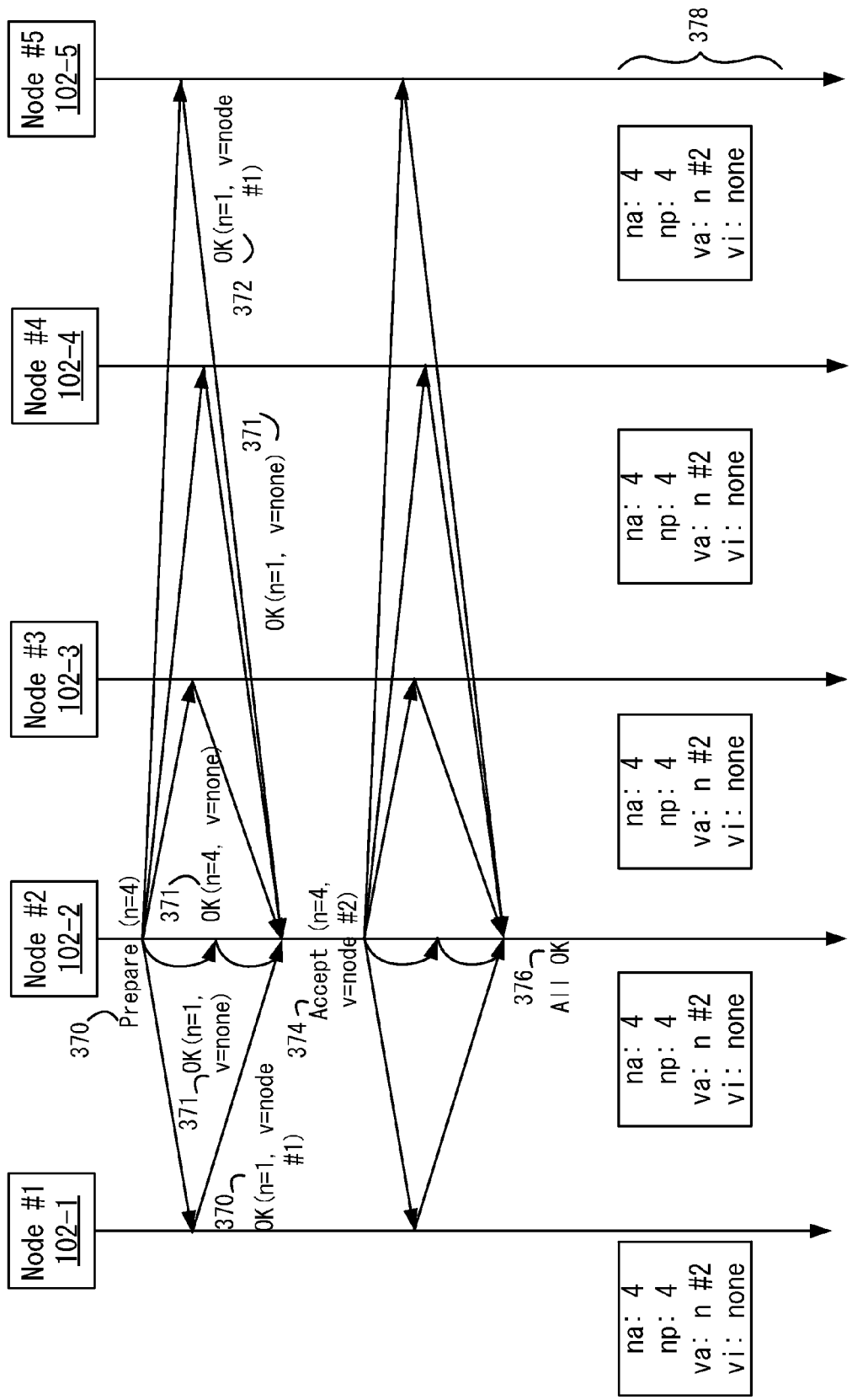
FIG. 3I depicts a fifth part of the method for node #2 attempting to become the leader according to one embodiment.

FIG. 3I depicts a fifth part of the method for node #2 attempting to become the leader according to one embodiment. Since node #2 does not have a leader, at 370, node #2 uses prepare service 214 in preparation to elect a new leader with a message prepare (n=4). In this case, at 371, node #3 and node #4 respond with a message okay (v=none) which indicates the prepare message is accepted and there is no leader.

At 372, node #5 and node #1 accept the prepare message with a message—okay (v=node #1), which indicates that node #1 is the current leader. However, because node #2 has the invalidated value vi=node #1, these two messages are ignored. Due to having a quorum in the group of node #2, node #3, and node #4 not having a leader, at 374, node #2 moves forward with the accept phase by sending an accept message—accept (n=4, v=node #2). This proposes node #2 as the leader. Because the proposal number n=4 is greater than the current highest proposal number and node #2 is not an invalidated value, at 376, all nodes accept this value as the new leader.

At 378, the values of the variables are now na=4, np=4, va=node #2, and vi=none. In this case, the new elected value va is node #2 and there are no invalidated values. This illustrates how the validation mechanism prevents progress in the case of the re-election of an invalid node and motivates progress toward election of a new leader. Although in the above process, node #1 proposed itself, it is possible that another node proposed node #1 as the leader, such as node #5, which still thought node #1 was the leader.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   storing, by a first computing node in a group of computing nodes, a first variable for a first proposal number that was accepted, a second variable for a second proposal number of an accepted leader, a third variable for the accepted leader, and a fourth variable for an invalidated computing node in storage;
   performing, by the first computing node, a first comparison with the first variable and a third proposal number to determine whether to accept or reject a proposal for an election of a leader;
   performing, by the first computing node, a second comparison with a fourth proposal number and the first variable and the second variable to determine whether to accept or reject a commitment to a proposed leader in the election when it is determined the proposal of the election is accepted;
   performing, by the first computing node, a third comparison with the fourth variable and an identifier for the proposed leader to determine whether the proposed leader has been invalidated or not when it is determined the commitment is accepted;
   when it is determined the proposed leader has not been invalidated, overwriting, by the first computing node, an identifier in the third variable with the identifier for the proposed leader in the storage to elect the proposed leader as a new accepted leader for the group of computing nodes; and accepting, by the first computing node, a communication from the new accepted leader to coordinate performing an action based on the identifier for the new accepted leader being stored in the third variable.

2. The method of claim 1, wherein performing the first comparison comprises:
   determining whether the third proposal number is higher than the first proposal number of the first variable;
   accepting the proposal of the election when the third proposal number is higher than the first proposal number; and
   rejecting the proposal of the election when the third proposal number is lower than the first proposal number.

3. The method of claim 2, further comprising:
   receiving a first message with the third proposal number for the proposal for the election of the leader;
   returning a second message with the third variable that accepts the proposal for the election when the third proposal number is higher than the first proposal number; and
   returning a third message with the first variable that rejects the proposal for the election when the third proposal number is lower than the first proposal number.

4. The method of claim 1, wherein performing the second comparison comprises:
   determining whether the third proposal number is higher than the first proposal number of the first variable;
   determining whether the third proposal number is higher than the second proposal number of the second variable; and
   performing the third comparison when the third proposal number is higher than the first proposal number of the first variable and the second proposal number of the second variable.

5. The method of claim 4, wherein overwriting an identifier in the third variable with the identifier for the proposed leader comprises:
   overwriting the identifier for the proposed leader in the third variable when the third proposal number is higher than the first proposal number of the first variable and the second proposal number of the second variable and the identifier for the proposed leader is not equal to the identifier for the proposed leader of the fourth variable.

6. The method of claim 5, further comprising:
   receiving a first message with the third proposal number and the identifier for the proposed leader;
   returning a second message with the second proposal number of the second variable that accepts the proposed leader when the third proposal number is higher than the first proposal number of the first variable and the second proposal number of the second variable and the identifier for the proposed leader is not equal to the fourth value; and
   returning a third message with the first proposal number of the first variable that rejects the proposed leader when the third proposal number is lower than either the first proposal number of the first variable and the second proposal number of the second variable or the identifier for the proposed leader is equal to the fourth variable.

7. The method of claim 1, further comprising:
   sending a health check message to the new accepted leader;
   determining a failure with the new accepted leader based on the sending of the health check message; and
   changing the third variable to a value of no leader and changing a value of the fourth variable to a value of the new accepted leader in which the failure was determined.

8. A first computing node comprising:
   one or more computer processors; and
   a non-transitory computer-readable storage medium comprising instructions, that when executed, control the one or more computer processors to be configured for:
   storing, by the first computing node in a group of computing nodes, a first variable for a first proposal number that was accepted, a second variable for a second proposal number of an accepted leader, a third variable for the accepted leader, and a fourth variable for an invalidated computing node in storage;
   performing, by the first computing node, a first comparison with the first variable and a third proposal number to determine whether to accept or reject a proposal for an election of a leader;
   performing, by the first computing node, a second comparison with a fourth proposal number and the first variable and the second variable to determine whether to accept or reject a commitment to a proposed leader in the election when it is determined the proposal of the election is accepted;
   performing, by the first computing node, a third comparison with the fourth variable and an identifier for the proposed leader to determine whether the proposed leader has been invalidated or not when it is determined the commitment is accepted;
   when it is determined the proposed leader has not been invalidated, overwriting, by the first computing node, an identifier in the third variable with the identifier for the proposed leader in the storage to elect the proposed leader as a new accepted leader for the group of computing nodes; and
   accepting, by the first computing node, a communication from the new accepted leader to coordinate performing an action based on the identifier for the new accepted leader being stored in the third variable.

9. The first computing node of claim 8, wherein performing the first comparison comprises:
   determining whether the third proposal number is higher than the first proposal number of the first variable;
   accepting the proposal of the election when the third proposal number is higher than the first proposal number; and
   rejecting the proposal of the election when the third proposal number is lower than the first proposal number.

10. The first computing node of claim 8, wherein performing the second comparison comprises:
    determining whether the third proposal number is higher than the first proposal number of the first variable;
    determining whether the third proposal number is higher than the second proposal number of the second variable; and
    performing the third comparison when the third proposal number is higher than the first proposal number of the first variable and the second proposal number of the second variable.

11. The first computing node of claim 10, wherein overwriting an identifier in the third variable with the identifier for the proposed leader comprises:
    overwriting the identifier for the proposed leader in the third variable when the third proposal number is higher than the first proposal number of the first variable and the second proposal number of the second variable and the identifier for the proposed leader is not equal to the identifier for the proposed leader of the fourth variable.

12. The first computing node of claim 11, further configured for:
receiving a first message with the third proposal number and the identifier for the proposed leader;
returning a second message with the second proposal number of the second variable that accepts the proposed leader when the third proposal number is higher than the first proposal number of the first variable and the second proposal number of the second variable and the identifier for the proposed leader is not equal to the fourth value; and
returning a third message with the first proposal number of the first variable that rejects the proposed leader when the third proposal number is lower than either the first proposal number of the first variable and the second proposal number of the second variable or the identifier for the proposed leader is equal to the fourth variable.

13. The first computing node of claim 8, further configured for:
sending a health check message to the new accepted leader;
determining a failure with the new accepted leader based on the sending of the health check message; and
changing the third variable to a value of no leader and changing a value of the fourth variable to a value of the new accepted leader in which the failure was determined.

14. A non-transitory computer-readable storage medium comprising instructions, that when executed, control the one or more computer processors to be configured for:
storing, by a first computing node in a group of computing nodes, a first variable for a first proposal number that was accepted, a second variable for a second proposal number of an accepted leader, a third variable for the accepted leader, and a fourth variable for an invalidated computing node in storage;
performing, by the first computing node, a first comparison with the first variable and a third proposal number to determine whether to accept or reject a proposal for an election of a leader;
performing, by the first computing node, a second comparison with a fourth proposal number and the first variable and the second variable to determine whether to accept or reject a commitment to a proposed leader in the election when it is determined the proposal of the election is accepted;
performing, by the first computing node, a third comparison with the fourth variable and an identifier for the proposed leader to determine whether the proposed leader has been invalidated or not when it is determined the commitment is accepted;
when it is determined the proposed leader has not been invalidated, overwriting, by the first computing node, an identifier in the third variable with the identifier for the proposed leader in the storage to elect the proposed leader as a new accepted leader for the group of computing nodes; and
accepting, by the first computing node, a communication from the new accepted leader to coordinate performing an action based on the identifier for the new accepted leader being stored in the third variable.

15. The non-transitory computer-readable storage medium of claim 14, wherein performing the first comparison comprises:
determining whether the third proposal number is higher than the first proposal number of the first variable;
accepting the proposal of the election when the third proposal number is higher than the first proposal number; and
rejecting the proposal of the election when the third proposal number is lower than the first proposal number.

16. The non-transitory computer-readable storage medium of claim 15, further comprising:
receiving a first message with the third proposal number for the proposal for the election of the leader;
returning a second message with the third variable that accepts the proposal for the election when the third proposal number is higher than the first proposal number; and
returning a third message with the first variable that rejects the proposal for the election when the third proposal number is lower than the first proposal number.

17. The non-transitory computer-readable storage medium of claim 14, wherein performing the second comparison comprises:
determining whether the third proposal number is higher than the first proposal number of the first variable;
determining whether the third proposal number is higher than the second proposal number of the second variable; and
performing the third comparison when the third proposal number is higher than the first proposal number of the first variable and the second proposal number of the second variable.

18. The non-transitory computer-readable storage medium of claim 17, wherein overwriting an identifier in the third variable with the identifier for the proposed leader comprises:
overwriting the identifier for the proposed leader in the third variable when the third proposal number is higher than the first proposal number of the first variable and the second proposal number of the second variable and the identifier for the proposed leader is not equal to the identifier for the proposed leader of the fourth variable.

19. The non-transitory computer-readable storage medium of claim 18, further configured for:
receiving a first message with the third proposal number and the identifier for the proposed leader;
returning a second message with the second proposal number of the second variable that accepts the proposed leader when the third proposal number is higher than the first proposal number of the first variable and the second proposal number of the second variable and the identifier for the proposed leader is not equal to the fourth value; and
returning a third message with the first proposal number of the first variable that rejects the proposed leader when the third proposal number is lower than either the first proposal number of the first variable and the second proposal number of the second variable or the identifier for the proposed leader is equal to the fourth variable.

20. The non-transitory computer-readable storage medium of claim 14, further configured for:
sending a health check message to the new accepted leader;

determining a failure with the new accepted leader based on the sending of the health check message; and changing the third variable to a value of no leader and changing a value of the fourth variable to a value of the new accepted leader in which the failure was determined.

* * * * *